Nov. 15, 1966        D. P. HAND        3,285,449

CARRIER VEHICLE TRANSPORT SYSTEM

Filed Feb. 19, 1965

DOUGLAS P. HAND
*INVENTOR.*

BY [signature]

ATTORNEYS

United States Patent Office 3,285,449
Patented Nov. 15, 1966

3,285,449
CARRIER VEHICLE TRANSPORT SYSTEM
Douglas P. Hand, 1258 W. Pender, Vancouver,
British Columbia, Canada
Filed Feb. 19, 1965, Ser. No. 433,867
5 Claims. (Cl. 214—515)

The present invention relates to a novel structural arrangement for adapting a specialized carrier vehicle for highway transport with the use of a conventional tractor and trailer such as commonly used in the logging industry.

The carrier vehicles referred to are of the general type which are used in mounting production machinery such as winches, logging yarders, air compressors, etc. This type of vehicle is generally provided with a specialized platform or deck for mounting the production unit and miscellaneous equipment where it is necessary to move the equipment about on rugged and uneven terrain. Such vehicles are either of the tracked type or a special wheel base type for greater stability and maneuverability and are not generally adapted for open road travel. In the past, carrier vehicles of this type have either had to be loaded bodily on a special truck bed or have been moved at extremely slow speed along the edge of paved roads with an obvious loss of time and with damage to either the equipment or the roads traveled. The problem becomes even more acute with extremely heavy equipment, often necessitating partial dismantling of the equipment to be moved.

Accordingly, the primary object of the present invention is to provide a novel structural arrangement for adapting heavy carrier vehicles and associated equipment for easy and rapid transport.

A further object of the present invention is to adapt heavy carrier vehicles of the character described for direct mounting between a conventional tractor and trailer such as commonly used in trucking such items as logs, beams, pipes or the like.

The means by which the foregoing objects and other advantages, which will be apparent to those skilled in the art, are accomplished, are set forth in the following specification and claims and are illustrated in the accompanying drawings dealing with the preferred embodiment. Reference is now made to the accompanying drawings, in which:

FIG. 2 is a cross-section taken along lines 2—2 of FIG. 1; and

Figure 1:
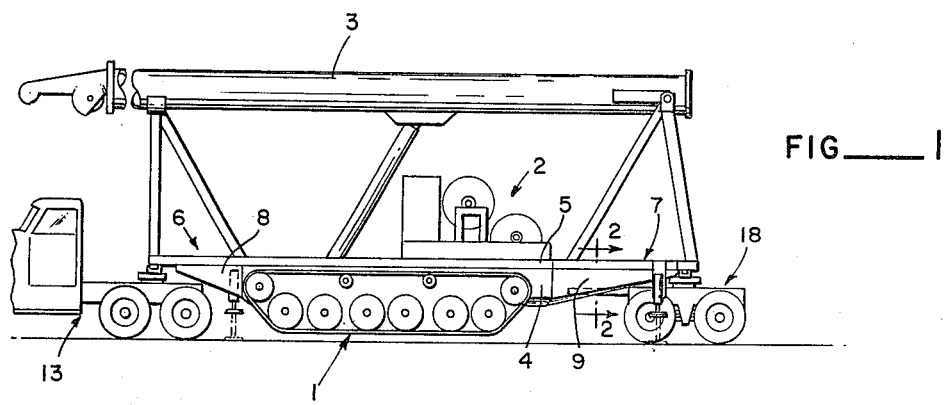
FIG. 1 is a side elevation of a carrier vehicle mounted for transport according to the present invention.

Referring now to the drawings, wherein like reference numerals are used to indicate identical parts of the various views, the particular carrier vehicle illustrated is a tracked vehicle indicated generally at 1 which, in the present instance, is used to mount a yarder unit indicated schematically at 2 and a metal spar tree indicated generally at 3. As previously mentioned, the carrier vehicle will not necessarily be a tracked vehicle but may be any vehicle with a special wheel base which is unsatisfactory for road travel.

Figure 3:
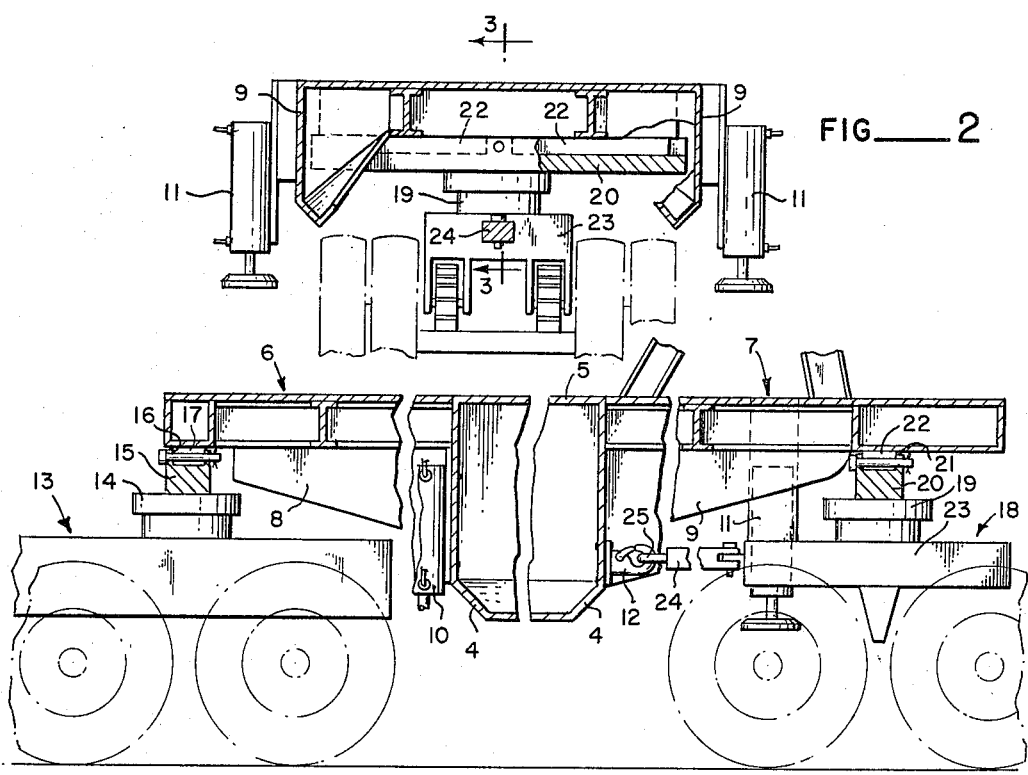
FIG. 3 is a cross-section taken along lines 3—3 of FIG. 2.

As illustrated in FIGS. 1 and 3, the vehicle 1 includes a body portion 4 having a special platform or deck 5 for mounting the yarder 2. According to the present invention, the body 4 is provided with a forward extension 6 and a rear extension 7 which may be formed from steel beams or the like connected directly to the body 4 by any conventional means such as welding, bolting or the like. The forward extension 6 also includes the front brace plates 8 for strengthening the extension as illustrated in the drawings. The rear extension 7 likewise includes the brace plates 9 for like purpose and also for mounting outrigger jacks or other lifting devices presently to be described. Although the present embodiment illustrates the front and rear extensions 6 and 7 respectively as being permanently fixed to the vehicle body it will be obvious that the extensions may be made easily demountable where desired. This may be the case in instances where the extensions are used solely for transport of the vehicle and it is advantageous to reduce the length of the vehicle for increased maneuverability.

A hydraulic lift cylinder 10 with a ground shoe is mounted on the forward end of the body 4 of the carrier vehicle and is normally used in stabilizing the vehicle during field use. The lift cylinder is also used to raise the vehicle for mounting on the tractor as will presently be described. Although the particular lift device shown is a hydraulic cylinder, it will be understood that any equivalent retractable life device may be substituted or any number of such lift devices may be used instead of the single cylinder illustrated. Two identical hydraulic lift cylinders 11 are mounted on opposite sides of the rear end of the rear extension 7 and include ground shoes as illustrated. The rear lift cylinders 11 may be mounted as outriggers on the rear end of the brace plates 9 to allow sufficient room for insertion of a trailer beneath the rear extension 7. The rear lift cylinders may be in all respects identical to the front lift cylinder 10 or may constitute any equivalent lifting device. As in the case of the front lift cylinder 10, the cylinders 11 may be used during field work to stabilize the carrier vehicle to provide a firm base for the tower 3 or any other equipment carried on the bed 5. The rear end of the body 4 also includes a conventional towing hook 12 which may be fixed in any suitable manner to the end wall of the body for a purpose to be described.

A conventional tractor is illustrated at 13 which includes a swivel base 14 and a transverse bunk 15 normally used for supporting logs, pipes, beams or the like during normal hauling. The bunk 15 is provided with a channel 16 for receiving one or a plurality of transversely directed ribs or attaching bars 17 carried on the underside of the front edge of the forward extension 6. With the vehicle 1 in the carrying position as shown in the drawings, the bars 17 fit snugly within the channel 16 and may be pinned in place by any suitable means, such as the pin shown to couple the vehicle to the tractor. The trailer for the tractor 13 is illustrated generally at 18 and also includes a swivel base 19 for mounting a transverse bunk 20. The bunk 20 includes the channel 21 for the reception of the rear cross-ribs or bars 22 fixed on the underside of the rear end of the rear extension 7 for coupling the vehicle to the trailer. As in the case of the cross-bars 17, the bars 22 may be pinned in place on the bunk 20 by any suitable pin or the like to prevent lateral movement of the carrier vehicle with respect to the trailer and tractor. The swivel base 19 of the trailer is carried on a trailer bed 23 which also includes an articulated tongue 24 which is normally extensible to accommodate various lengths of load. The forward end of the tongue 24 is equipped with an eye 25 for connection to the hook 12 on the end of the carrier body. With this arrangement, the rear end of the carrier body and extension 7 are supported on the trailer 18 and the bed and wheels of the trailer are allowed to pivot beneath the load during turning.

In describing the use of the present invention, it will be appreciated that the carrier vehicle 1 is provided with its own motive power means for maneuvering on the job site and is normally braced for use by lowering the rear outrigger hydraulic jacks 11 and the front jack or cylinder 10. When it is desired to transport the carrier vehicle and associated machinery, the hydraulic jacks are raised and the vehicle is used to move the unit to level ground, ready for mounting on a tractor-trailer combination. With the vehicle on substantially level ground, the front and rear jacks are again lowered so as to lift the entire vehicle off the ground a sufficient distance to allow the tractor 13 and the trailer 18 to be inserted under the front and rear ends of the vehicle respectively. With the bunk 15 of the tractor and the bunk 20 of the trailer located in position under the raised vehicle, and with the tongue 24 of the trailer connected to the hook 12, the jacks are raised to allow the carrier vehicle to be lowered with the cross-bars 17 and 22 engaging the channels in the bunks 15 and 20 respectively. The cross-bars may then be pinned in place by any suitable means and the jacks completely raised. The vehicle is then ready for transport. The reverse procedure is used to set the carrier vehicle on the ground at a new location.

It will be readily apparent to those skilled in the art that the present invention provides novel and useful improvements in carrier vehicles of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In a carrier vehicle having a body and ground support means unsuitable for road travel, mechanism for adapting said vehicle for transport by a tractor-trailer combination comprising; front and rear extensions connected to the vehicle body, a fluid operated lift jack mounted on the front end of the body and first and second fluid operated lift jacks carried on opposite sides of said rear extension for elevating the body, a transversely extending rib fixed to the underside of the front extension for engaging a bunk on a tractor and a transversely extending rib fixed to the underside of the rear extension for engaging a bunk on a trailer, and means for connecting the tongue of a trailer to the vehicle body, whereby said ribs are adapted to be received by channels in the tractor and trailer bunks respectively for securing the ends of the vehicle between the tractor and trailer for transport.

2. A carrier vehicle comprising; a body structure including ground support means for moving the vehicle, a deck on said body for supporting a production unit, front and rear extensions mounted on the front and rear portions respectively of said body and being substantially at the level of said deck and extending a substantial distance beyond the ground support means, said extensions being provided with brace plates extending between the sides thereof and the sides of the body structure, vertically movable ground engaging lift means comprising a fluid operated lift jack mounted on the front end of the body structure and first and second fluid operated lift jacks carried by the brace plates on opposite sides of said rear extension for lifting said vehicle, a transversely extending rib fixed to the underside of the front extension for engaging a bunk on a tractor and a transversely extending rib fixed to the underside of the rear extension for engaging a bunk on a trailer and means for connecting the tongue of a trailer to the rear end of the vehicle body, whereby said ribs are adapted to be received by channels in the tractor and trailer bunks respectively for securing the ends of the vehicle between the tractor and trailer.

3. In a carrier vehicle having a body structure, ground support means for moving the vehicle and a deck mounted on said body structure for supporting a production unit, a mechanism for adapting said vehicle to be suspended between and bodily transported by a tractor-trailer combination comprising; front and rear extensions mounted on the front and rear portions of said body and being substantially at the level of said deck and extending a substantial distance beyond the ground support means, said extensions being provided with brace plates extending between the sides of the extensions and the sides of the body, vertically movable ground engaging lift means comprising a fluid operated lift jack mounted on the front end of the body structure and first and second fluid operated lift jacks carried by the brace plates on opposite sides of said rear extension for lifting the body and ground support means, a transversely extending rib fixed to the underside of the front extension for engaging a bunk on a tractor and a transversely extending rib fixed to the underside of the rear extension for engaging a bunk on a trailer, said ribs being adapted to be received by channels in the tractor and trailer bunks respectively, and means for connecting the forward end of a trailer tongue to the rear end of the vehicle body, whereby said vehicle may be raised from the ground by said lift means and a tractor and trailer inserted beneath the front and rear extensions respectively with the tongue of the trailer being connected to the rear end of the vehicle body for suspending and bodily transporting said vehicle.

4. In a carrier vehicle having a body and ground support means unsuitable for road travel, a mechanism for adapting said vehicle for transport by a tractor-trailer combination comprising; front and rear extensions connected to the vehicle body, lift means mounted on said vehicle for elevating said body and ground support means, first coupling means mounted on the underside of the front extension for coupling the front extension to a bunk on a tractor, second coupling means mounted on the underside of the rear extension for coupling the rear extension to a bunk on a trailer, said body and ground support means being elevated above ground level when said first and second coupling means are engaged with the tractor and trailer bunks respectively, and means for connecting the tongue of a trailer to the vehicle body, whereby said vehicle may be elevated by said lift means and lowered so as to be suspended between and supported by a tractor and trailer for transport.

5. The device according to claim 4 wherein; said first and second coupling means comprise respectively, a first transversely extending rib fixed to the underside of the front extension and a second transversely extending rib fixed to the underside of the rear extension, whereby said ribs are adapted to be received by channels in the tractor and trailer bunks respectively for coupling the ends of the vehicle between the tractor and trailer.

References Cited by the Examiner

UNITED STATES PATENTS

| 2,703,659 | 3/1955 | Hutchins | 280—423 |
| 2,731,276 | 1/1956 | Cross | 280—81 |
| 2,751,234 | 6/1956 | Couse | 280—30 |
| 2,794,565 | 6/1957 | Ratliff | 280—423 |
| 2,919,928 | 1/1960 | Hoffer | 280—423 |

FOREIGN PATENTS

| 458,515 | 8/1949 | Canada. |
| 785,578 | 5/1935 | France. |
| 926,224 | 4/1955 | Germany. |

LEO FRIAGLIA, *Primary Examiner.*